(12) United States Patent
Li et al.

(10) Patent No.: US 12,254,676 B2
(45) Date of Patent: Mar. 18, 2025

(54) PEDESTRIAN RE-IDENTIFICATION METHOD, SYSTEM AND DEVICE, AND COMPUTER-READABLE STORAGE MEDIUM

(71) Applicant: SUZHOU METABRAIN INTELLIGENT TECHNOLOGY CO., LTD., Jiangsu (CN)

(72) Inventors: Rengang Li, Jiangsu (CN); Li Wang, Jiangsu (CN); Zhenhua Guo, Jiangsu (CN); Baoyu Fan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,204

(22) PCT Filed: Sep. 28, 2022

(86) PCT No.: PCT/CN2022/122305
§ 371 (c)(1),
(2) Date: Jun. 26, 2024

(87) PCT Pub. No.: WO2023/206964
PCT Pub. Date: Nov. 2, 2023

(65) Prior Publication Data
US 2024/0420456 A1 Dec. 19, 2024

(30) Foreign Application Priority Data
Apr. 30, 2022 (CN) .......................... 202210469672.1

(51) Int. Cl.
*G06V 10/774* (2022.01)
*G06V 10/26* (2022.01)
(Continued)

(52) U.S. Cl.
CPC ............ *G06V 10/774* (2022.01); *G06V 10/26* (2022.01); *G06V 10/761* (2022.01); *G06V 10/82* (2022.01); *G06V 40/103* (2022.01)

(58) Field of Classification Search
None
See application file for complete search history.

(56) References Cited

U.S. PATENT DOCUMENTS

| 2016/0171346 A1 | 6/2016 | Han et al. |
| 2020/0226421 A1* | 7/2020 | Almazan ................ G06N 3/045 |

(Continued)

FOREIGN PATENT DOCUMENTS

| CN | 112541448 A | 3/2021 |
| CN | 112766218 A | 5/2021 |

(Continued)

*Primary Examiner* — Leon Flores
(74) *Attorney, Agent, or Firm* — IPro, PLLC

(57) ABSTRACT

Provided in the present application are a disk processing method and system, and an electronic device. The method comprises: when disk alarm information is detected, marking a corresponding alarm disk as a faulty disk; detecting the state of a disk group corresponding to the faulty disk; if the state of the disk group is degraded, marking the faulty disk as an isolation disk, and generating alarm information; if the state of the disk group is healthy, determining whether there is a redundant disk group; if there is no redundant disk group, operating the faulty disk according to a first preset rule, and generating alarm information; and if there is a redundant disk group, detecting the state of the redundant disk group, if the state of the redundant disk group is healthy, marking the faulty disk as the isolation disk, and generating alarm information, otherwise, operating the faulty disk according to a second preset rule, and generating alarm information.

20 Claims, 5 Drawing Sheets

(51) Int. Cl.
*G06V 10/74* (2022.01)
*G06V 10/82* (2022.01)
*G06V 40/10* (2022.01)

(56) References Cited

U.S. PATENT DOCUMENTS

2021/0319215 A1* 10/2021 Zhang .................. G06V 10/774
2022/0374630 A1* 11/2022 Huang .................. G06F 18/214

FOREIGN PATENT DOCUMENTS

| CN | 112836611 A | 5/2021 |
| CN | 113780066 A | 12/2021 |
| CN | 114596592 A | 6/2022 |
| CN | 114821651 A | 7/2022 |

* cited by examiner

PEDESTRIAN RE-IDENTIFICATION METHOD, SYSTEM AND DEVICE, AND COMPUTER-READABLE STORAGE MEDIUM

CROSS-REFERENCE TO RELATED APPLICATIONS

The disclosure claims priority to Chinese Patent Application No. 202210469672.1, entitled "Pedestrian re-identification method, system and device, and computer-readable storage medium" filed on Apr. 30, 2022 to China Patent Office, the entire contents of which are incorporated herein by reference.

TECHNICAL FIELD

The disclosure relates to the technical field of deep learning, and more particularly to a pedestrian re-identification method, system and device, and a computer-readable storage medium.

BACKGROUND

At present, the deep learning is used to solve the problems in the field of computer vision, such as picture classification, image segmentation and object detection, and has achieved great success. Also, in recent years, many excellent convolution neural network models emerge. In this process, the pedestrian re-identification task has made great progress with the continuous development of in-deep learning technology. Pedestrian re-identification (Re-ID) is an important image identification technology, and is now regarded as a key sub-problem of image retrieval, which uses the computer vision algorithm to match pedestrian images or videos across devices, i.e., if a query image is given, the same pedestrian is retrieved from image databases of different monitoring devices. Pedestrian re-identification has become a research focus in the field of computer vision due to its great application prospect in intelligent security, photo album clustering and suspect search.

At present, in the process of pedestrian re-identification, the pedestrian re-identification network is constructed, and the pedestrian re-identification network is trained based on the tagged pedestrian image. Finally, the pedestrian re-identification is performed based on the trained pedestrian re-identification network. However, the training process of the existing pedestrian re-identification network is slow, which makes the operation efficiency of the pedestrian re-identification method low, and the robustness and applicability of the pedestrian re-identification network are poor.

SUMMARY

The object of the disclosure is to provide a method for pedestrian re-identification, which can solve to some extent the technical problem of how to improve the applicability of the pedestrian re-identification method. The disclosure also provides a system and a device for pedestrian re-identification and a computer-readable storage medium.

In order to achieve the above-mentioned object, the disclosure provides the following technical solutions.

A method for pedestrian re-identification includes:
acquiring a first-type pedestrian image without a label;
producing label information for the first-type pedestrian image;
training a target pedestrian re-identification network based on the first-type pedestrian image and the label information to obtain the target pedestrian re-identification network from a first training;
discarding a target region in the first-type pedestrian image to obtain a second-type pedestrian image; and
training the target pedestrian re-identification network from the first training based on the first-type pedestrian image and the second-type pedestrian image to obtain the target pedestrian re-identification network from a second training to perform pedestrian re-identification based on the target pedestrian re-identification network.

According to some embodiments, the producing label information for the first-type pedestrian image comprises:
determining body part boundary information in the first-type pedestrian image; and
using the body part boundary information as the label information of the first-type pedestrian image.

According to some embodiments, the determining body part boundary information in the first-type pedestrian image comprises:
determining the body part boundary information in the first-type pedestrian image based on a template matching method.

According to some embodiments, the determining the body part boundary information in the first-type pedestrian image based on a template matching method comprises:
acquiring a human body part template that is preset;
determining a body part region corresponding to the human body part template in the first-type pedestrian image;
determining boundary coordinates of the body part region, the boundary coordinates including a height value of a boundary of the body part region in a first-type pedestrian image; and
taking a ratio of the boundary coordinates to a total height of the first-type pedestrian image as the body part boundary information.

According to some embodiments, the human body part template comprises a head template, a torso template, and a lower limb template; the body part region comprises a head region, a torso region, and a lower limb region; the body part boundary information comprises starting boundary information of the head region, boundary information between the head region and the torso region, boundary information between the torso region and the lower limb region, and ending boundary information of the lower limb region.

According to some embodiments, the determining a body part region corresponding to the human body part template in the first-type pedestrian image comprises:
cutting a temporary image of the same size as the human body part template from the first-type pedestrian image;
calculating a similarity value between each of the temporary images and the human body part template; and
selecting the temporary image with a maximum similarity value as the body part region corresponding to the human body part template in the first-type pedestrian image.

According to some embodiments, the training a target pedestrian re-identification network based on the first-type pedestrian image and the label information to obtain the target pedestrian re-identification network from a first training comprises:
connecting the target pedestrian re-identification network with a first auxiliary network to obtain a first target network;

training the first target network based on the first-type pedestrian image and the label information to obtain the trained first target network; and removing the first auxiliary network from the trained first target network to obtain the target pedestrian re-identification network from the first training.

According to some embodiments, the target pedestrian re-identification network comprises a ResNet50 network; and the first auxiliary network includes a fully connected layer connected to a seventh portion of the Resnet50 network.

According to some embodiments, the discarding a target region in the first-type pedestrian image to obtain a second-type pedestrian image comprises:

dividing the first-type pedestrian image into a preset quantity of grids;

randomly selecting the preset quantity of grids from the grids as the target region for being discarded; and filling pixels of the target region in the first-type pedestrian image to zero to obtain the second-type pedestrian image.

According to some embodiments, the training the target pedestrian re-identification network from the first training based on the first-type pedestrian image and the second-type pedestrian image to obtain the target pedestrian re-identification network from a second training comprises:

connecting the target pedestrian re-identification network from the first training with a second auxiliary network to obtain a second target network;

training the second target network based on the first-type pedestrian image and the second-type pedestrian image to obtain the trained second target network; and removing the second auxiliary network from the second target network to obtain a target pedestrian re-identification network from a second training.

According to some embodiments, the target pedestrian re-identification network comprises a ResNet50 network; and the second auxiliary network includes an image segmentation network connected to first and fourth portions of the Resnet50 network.

A system for pedestrian re-identification is disclosed, comprising:

a first acquisition module configured for acquiring a first-type pedestrian image without a label;

a first production module configured for producing label information for the first-type pedestrian image;

a first training module configured for training a target pedestrian re-identification network based on the first-type pedestrian image and the label information to obtain the target pedestrian re-identification network from a first training;

a second production module configured for discarding a target region in the first-type pedestrian image to obtain a second-type pedestrian image; and a second training module configured for training the target pedestrian re-identification network from the first training based on the first-type pedestrian image and the second-type pedestrian image to obtain the target pedestrian re-identification network from a second training to perform pedestrian re-identification based on the target pedestrian re-identification network.

A device for pedestrian re-identification is disclosed, comprising:

a memory configured for storing a computer program; and a processor configured for implementing the steps of the method for pedestrian re-identification above when executing the computer program.

A non-volatile computer readable storage medium is disclosed, wherein the computer non-volatile readable storage medium has stored therein a computer program which when executed by a processor implements the steps of the method for pedestrian re-identification above.

The disclosure provides a method for pedestrian re-identification. including acquiring a first-type pedestrian image without a label; producing label information for the first-type pedestrian image; training a target pedestrian re-identification network based on the first-type pedestrian image and the label information to obtain the target pedestrian re-identification network from a first training; discarding a target region in the first-type pedestrian image to obtain a second-type pedestrian image; and training the target pedestrian re-identification network from the first training based on the first-type pedestrian image and the second-type pedestrian image to obtain the target pedestrian re-identification network from a second training to perform pedestrian re-identification based on the target pedestrian re-identification network. In the disclosure, the label information can be produced for the first-type pedestrian image, so that the label can be automatically and quickly added to the pedestrian image without a label. In this way, the target pedestrian re-identification network can be trained on the basis of the first-type pedestrian image and the label information, so as to obtain the target pedestrian re-identification network from the first training. That is to say, the pedestrian information in the pedestrian image without the label can also be used for training the target pedestrian re-identification network. In addition, the target region in the first-type pedestrian image is discarded to obtain the second-type pedestrian image. The target pedestrian re-identification network from the first training is trained based on the first-type pedestrian image and the second-type pedestrian image to obtain the target pedestrian re-identification network from the second training, which increases the quantity of training samples and improves the robustness of the target pedestrian re-identification network compared with the method of training the network only based on the pedestrian image with the label. In addition, the training efficiency of target pedestrian identification network is improved, and then the operation efficiency of pedestrian identification method is improved. It has better applicability compared to the prior art. The corresponding technical problem is also solved by a system and a device for pedestrian re-identification and a computer-readable storage medium provided in the disclosure.

BRIEF DESCRIPTION OF THE DRAWINGS

In order to more clearly describe the technical solutions in the embodiments of the disclosure or the prior art, the drawings to be used in the description of the embodiments or the prior art will be briefly introduced below. It will be apparent to those skilled in the art that the drawings in the following description are only some of the disclosure, and that other drawings may be obtained from the drawings without any creative works.

DETAILED DESCRIPTION OF THE EMBODIMENTS

The technical solutions in the embodiments of the disclosure will be described clearly and completely in conjunction with the accompanying drawings in the embodiments of the disclosure. Obviously, the described embodiments are only part of the embodiments of the disclosure, rather than all of the embodiments. Based on the embodiments in the disclosure, all other embodiments obtained by a person skilled in the art without involving any inventive effort are within the scope of protection of the disclosure.

Figure 1:
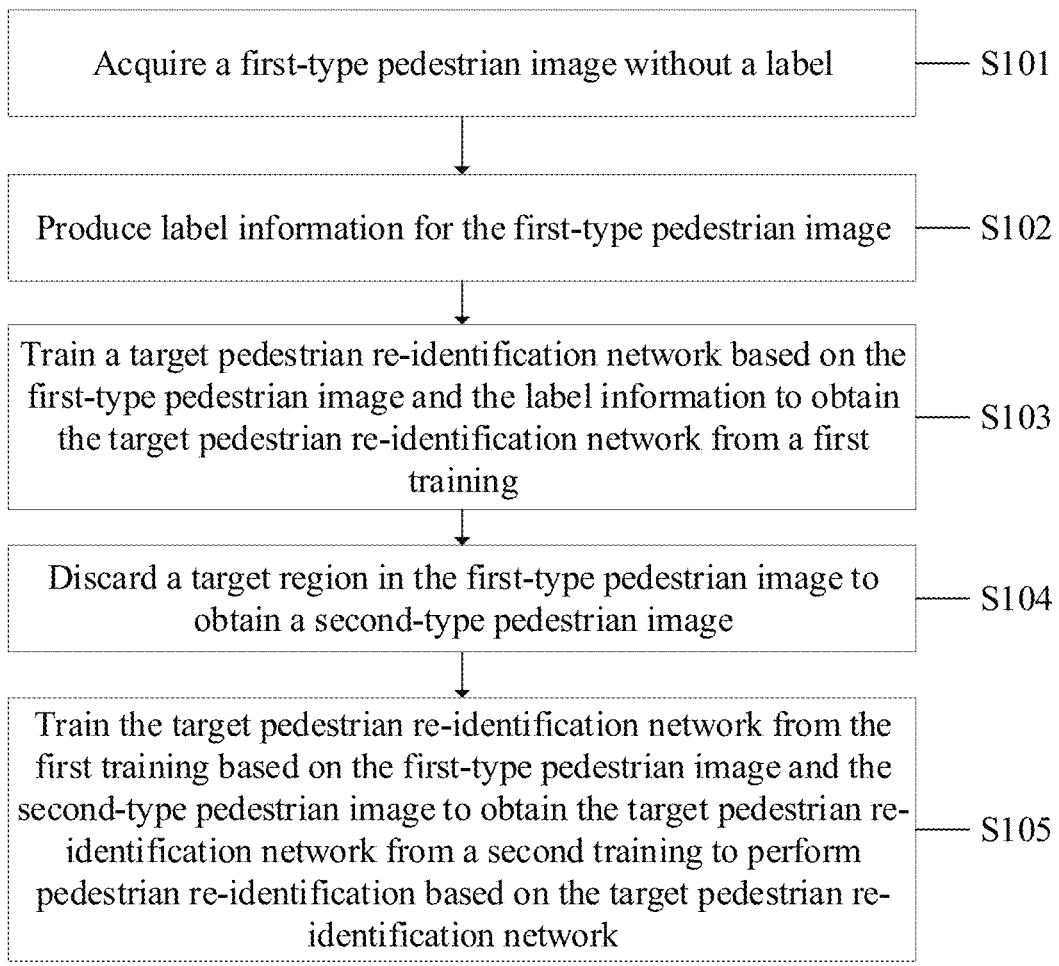
FIG. 1 is a flowchart of a method for pedestrian re-identification provided by an embodiment of the disclosure.

With reference to FIG. 1, FIG. 1 is a flowchart of a method for pedestrian re-identification provided by an embodiment of the disclosure;

Embodiments of the disclosure provide a method for pedestrian re-identification, which may include the following steps.

Step S101: a first-type pedestrian image without a label is acquired.

In practical applications, a first-type pedestrian image without a label can be acquired first, and the type of the first-type pedestrian image and the acquisition method, etc. may all be determined according to actual needs.

Step S102: label information for the first-type pedestrian image is produced.

In practical application, after acquiring a first-type pedestrian image without a label, the label information may be produced for the first-type pedestrian image so as to perform weak supervision training on a target pedestrian re-identification network subsequently based on the label information.

Step S103: a target pedestrian re-identification network based on the first-type pedestrian image and the label information is trained to obtain the target pedestrian re-identification network from a first training In practical application, after producing the label information for the first-type pedestrian image based on the template matching method, the target pedestrian re-identification network may be trained based on the first-type pedestrian image and the label information to obtain the target pedestrian re-identification network from a first training.

In an application scenario, in the process of training a target pedestrian re-identification network based on a first-type pedestrian image and label information to obtain a target pedestrian re-identification network from a first training, in order to facilitate training the target pedestrian re-identification network, the target pedestrian re-identification network can be connected to a first auxiliary network to obtain a first target network. The first target network is trained based on the first-type pedestrian image and the label information to obtain a trained first target network. The first auxiliary network is removed from the first target network to obtain a target pedestrian re-identification network from the first training.

Figure 2:
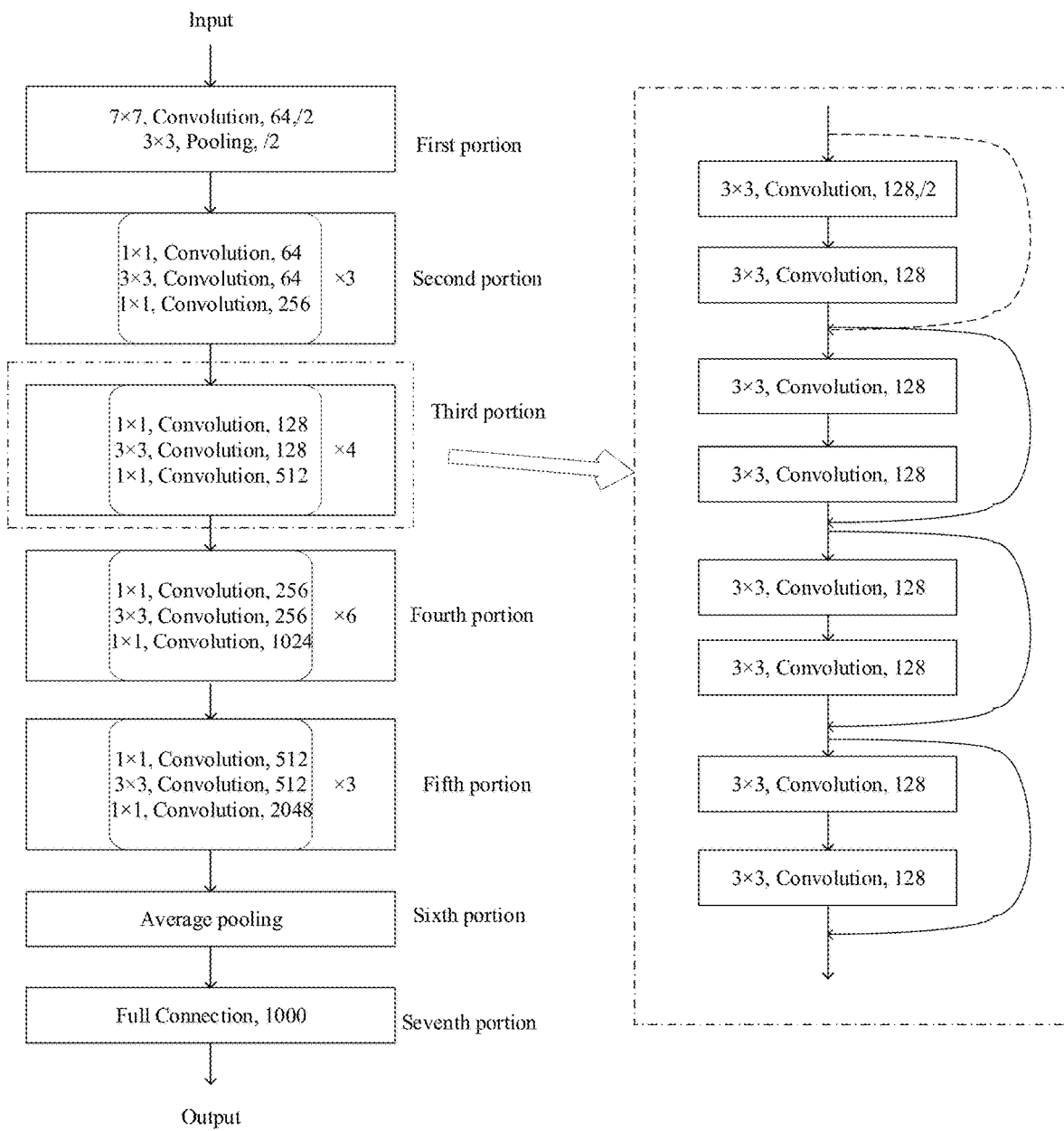
FIG. 2 is a structural diagram of a ResNet50 network.

In an application scenario, the target pedestrian re-identification network may include a ResNet50 network, and the structure thereof can be as shown in FIG. 2. The first portion does not include a residual block, and mainly performs convolution, regularization, activation function and maximum pooling calculation on an input. The second, third, fourth and fifth portion structure all include a residual block, and each residual block includes a three-layer convolution. After the convolution calculation of the first five portions, the pooling layer converts same into a feature vector. Finally, a classifier calculates the feature vector and outputs a numerical value of a coordinate regression. The first auxiliary network may include a fully connected layer connected to a seventh part of the Resnet50 network, and the size of the fully connected layer may be determined according to practical requirements. For example, the fully connected layer may be a fully connected layer including 12 neurons, etc.

It should be noted that the loss function of the first auxiliary network may be determined according to actual needs, and the disclosure is not particularly limited herein.

Step S104: a target region in the first-type pedestrian image is discarded to obtain a second-type pedestrian image.

Step S105: the target pedestrian re-identification network from the first training is trained based on the first-type pedestrian image and the second-type pedestrian image to obtain the target pedestrian re-identification network from a second training to perform pedestrian re-identification based on the target pedestrian re-identification network.

In practical applications, in order to further perform weak supervision training on the target pedestrian re-identification image, after the target pedestrian re-identification network is trained based on the first-type pedestrian image and the label information so as to obtain a target pedestrian re-identification network from a first training, the target region in the first-type pedestrian image is discarded so as to obtain a second-type pedestrian image. The target pedestrian re-identification network from the first training is trained based on the first-type pedestrian image and the second-type pedestrian image so as to obtain the target pedestrian re-identification network from a second training to perform pedestrian re-identification based on the target pedestrian re-identification network.

In an application scenario, in the process of discarding a target region in a first-type pedestrian image to obtain a second-type pedestrian image, the first-type pedestrian image may be divided into a preset quantity of grids, and a target quantity of grids are randomly selected from the grids as a target region for being discarded. A pixel of a target region in the first-type pedestrian image is filled with 0 so as to obtain a second-type pedestrian image, etc., and the disclosure does not specifically define same here.

In an application scenario, in the process of training the target pedestrian re-identification network from the first training on the basis of the first-type pedestrian image and the second-type pedestrian image so as to obtain the target pedestrian re-identification network from the second training, in order to facilitate the training of the target pedestrian re-identification network, the target pedestrian re-identification network of the first training may be connected to the second auxiliary network so as to obtain the second target network. The second target network is trained based on the first-type pedestrian image and the second-type pedestrian image to obtain a trained second target network. The second auxiliary network in the second target network is removed to obtain a target pedestrian re-identification network from a second training.

Figure 3:
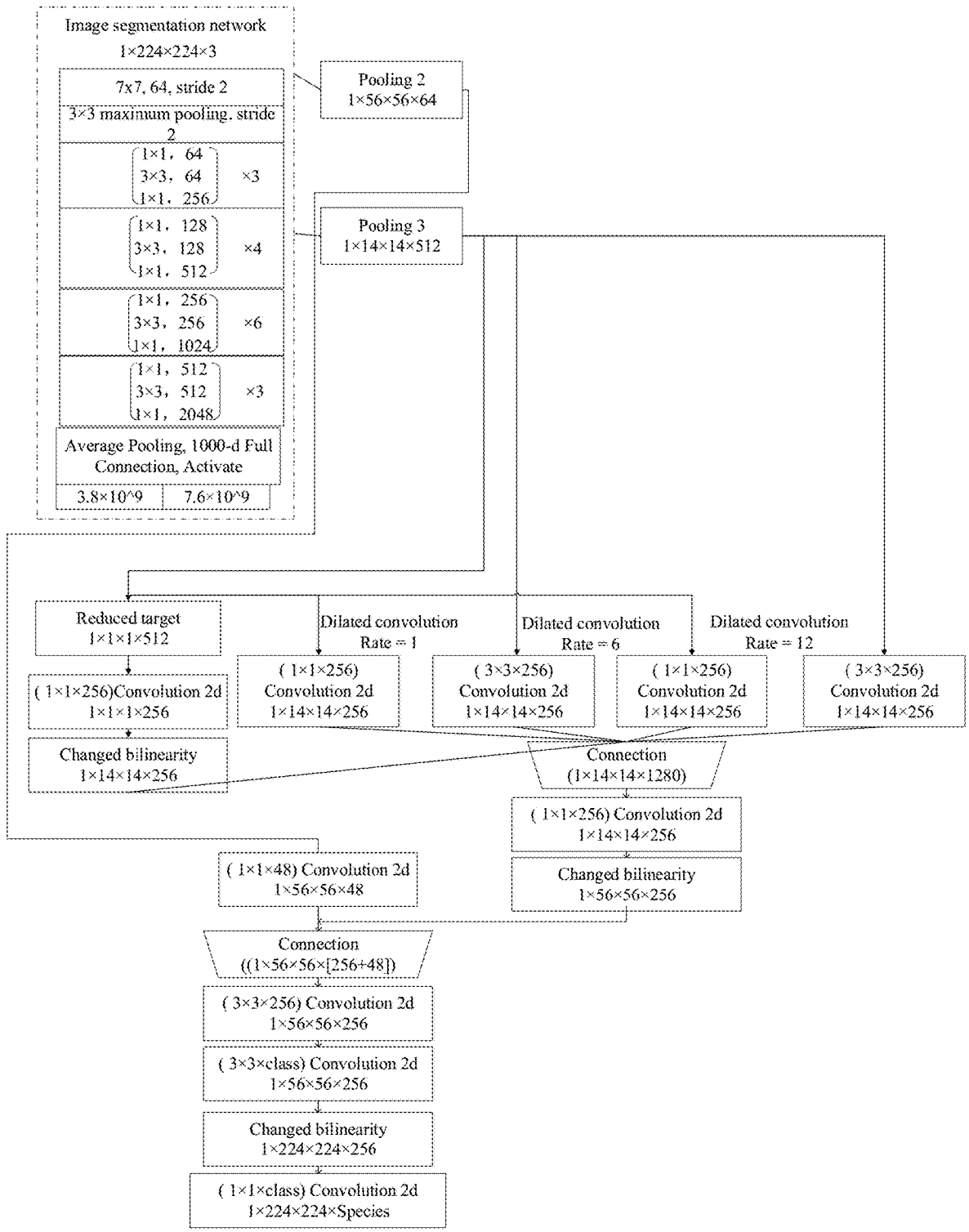
FIG. 3 is a structural diagram of a second auxiliary network.

In an application scenario, the target pedestrian re-identification network may include a ResNet50 network. The second auxiliary network may include an image segmentation network connected to the first portion and the fourth portion of the Resnet50 network, and the structure of the second auxiliary network may be as shown in FIG. 3. In the encoder portion of the image segmentation network, four types of dilated convolution blocks with different expansion rates and a global average pooling block are used to obtain a total of five groups of feature maps, which are spliced together, and are sent to the decoder module after passing through a 1×1 convolution block. In the decoder portion, the low-level feature map of the channel dimension reduction and the feature map obtained by the linear interpolation up-sampling are firstly spliced, and then sent to a group of 3×3 convolution blocks for processing. Finally, the linear interpolation and up-sampling is performed to obtain a prediction map with the same size as the resolution of an original map.

It should be noted that the loss function of the second auxiliary network may be determined according to actual needs, and the disclosure is not specifically limited therein. For example, the loss function of the second auxiliary network may be L2 loss, which is as follows:

$$L(\theta) = \frac{1}{N} \sum_{i=1}^{N} |O_i - I_i|^2;$$

where $L(\theta)$ represents a loss function value; $O_i$ represents an $i^{th}$ output feature at a last layer of the image segmentation network; and $I_i$ represents a $i^{th}$ image pixel in the first-type pedestrian image.

In an application scenario, after training the target pedestrian re-identification network from the first training based on the first-type pedestrian image and the second-type pedestrian image to obtain the target pedestrian re-identification network from the second training, a third-type pedestrian image with a label may also be acquired. The target pedestrian re-identification network from the second training is trained based on the third-type pedestrian image to obtain a trained target pedestrian re-identification network, so as to perform pedestrian re-identification based on the target pedestrian re-identification network.

The disclosure provides a method for pedestrian re-identification. including acquiring a first-type pedestrian image without a label; producing label information for the first-type pedestrian image; training a target pedestrian re-identification network based on the first-type pedestrian image and the label information to obtain the target pedestrian re-identification network from a first training; discarding a target region in the first-type pedestrian image to obtain a second-type pedestrian image; and training the target pedestrian re-identification network from the first training based on the first-type pedestrian image and the second-type pedestrian image to obtain the target pedestrian re-identification network from a second training to perform pedestrian re-identification based on the target pedestrian re-identification network. In the disclosure, the label information can be produced for the first-type pedestrian image, so that the label can be automatically and quickly added to the pedestrian image without a label. In this way, the target pedestrian re-identification network can be trained on the basis of the first-type pedestrian image and the label information, so as to obtain the target pedestrian re-identification network from the first training. That is to say, the pedestrian information in the pedestrian image without the label can also be used for training the target pedestrian re-identification network. In addition, the target region in the first-type pedestrian image is discarded to obtain the second-type pedestrian image. The target pedestrian re-identification network from the first training is trained based on the first-type pedestrian image and the second-type pedestrian image to obtain the target pedestrian re-identification network from the second training, which increases the quantity of training samples and improves the robustness of the target pedestrian re-identification network compared with the method of training the network only based on the pedestrian image with the label. Finally, since the target pedestrian re-identification network obtained in the second training has a network weight value, and the network weight value is adapted to the pedestrian image, while in the prior art, the pedestrian re-identification network has no initial weight value or the initial weight value is not adapted to the pedestrian image, the disclosure can accelerate the convergence rate of the target pedestrian re-identification network, improve the training efficiency of the target pedestrian re-identification network, and further improve the operation efficiency of the pedestrian re-identification method. It has better applicability compared to the prior art.

In a method for pedestrian re-identification provided in an embodiment of the disclosure, in the process of making label information for a first-type pedestrian image based on a template matching method, the body part boundary information in the first-type pedestrian image may be determined based on the template matching method. The body part boundary information is taken as the label information of the first-type pedestrian image.

In an application scenario, in the process of determining body part boundary information in a first-type pedestrian image based on a template matching method, a human body part template that is preset may be acquired. The human body part template includes a head template, a trunk template and a lower limb template. A body part region corresponding to the human body part template in the first-type pedestrian image is determined. The body part region includes a head region, a torso region and a lower limb region. Boundary coordinates of the body part region are determined, the boundary coordinates including a height value of a boundary of the body part region in the first-type pedestrian image. The ratio of the boundary coordinates to the total height of the first-type pedestrian image is taken as the body part boundary information.

It needs to be stated that in the process of acquiring a human body part template that is preset, some human body part images may be taken. The human body part may be manually taken as a human body part sample. The scale thereof can be standardized to a fixed scale to obtain a human body part template. Assuming that 100 samples are taken, gray level normalization is performed on all the human head images taken. The normalized head region samples of all the 100 samples are taken and normalized to obtain a head body region template, etc.

It should be noted that in the process of determining the body part region corresponding to the human body part template in the first-type pedestrian image, a temporary image with the same size as that of the human body part template may be cut out from the first-type pedestrian image. A similarity value between the temporary image and the human body part template is calculated based on the Euclidean distance, and the similarity value is recorded. This step is repeated until the similarity value between each temporary image in the first-type pedestrian image and the human body part template is obtained. Finally, the temporary image with the largest similarity value is selected as the body part region corresponding to the human body part template in the first-type pedestrian image. Herein, the formula for calculating the similarity value by the Euclidean distance may be as follows:

$$D(i, j) = \sum_{m=1}^{w} \sum_{n=1}^{h} [S^{ij}(m, n) - T(m, n)]^2;$$

where (i,j) represents a coordinate value of a temporary image; D(i,j) represents a similarity value; $S^{ij}(m,n)$ represents a pixel value at a coordinate (m,n) in the temporary image; T(m,n) represents a pixel value at the coordinate in the human body part template (m,n); and w×h represents a dimension of the human body part template.

Figure 4:
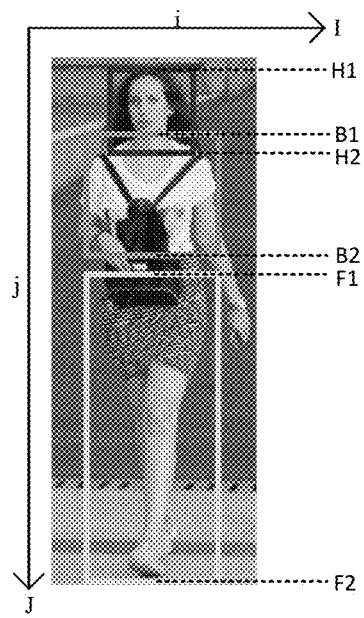
FIG. 4 is a boundary coordinate diagram of a pedestrian image.

Note that, in taking the ratio of the boundary coordinates to the total height of the first-type pedestrian image as the body part boundary information, the body part boundary information may be determined based on the following formula:

$$h_0 = H1;$$

$$h_1 = \frac{B1 + H2}{2};$$

$$h_2 = \frac{B2 + F1}{2};$$

$$h_3 = F2;$$

Where H1 represents an upper boundary coordinate of the head region; H2 represents a lower boundary coordinate of the head region; B1 and B2 respectively represents an upper boundary coordinate and a lower boundary coordinate of the torso region. F1 and F2 respectively represents an upper boundary coordinate and a lower boundary coordinate of the lower limb region, and this is shown, for example, in FIG. 4; $h_0$ represents a starting boundary coordinate of the head region; $h_1$ represents a boundary coordinate of the head region and the torso region; $h_2$ represents a boundary coordinate of the torso region and the lower limb region; and $h_3$ represents an ending boundary coordinate of the lower limb region. Assuming that the total height of the first-type pedestrian image is H, the final body part boundary information may be expressed as:

$$H_0 = \frac{h_0}{H}; H_1 = \frac{h_1}{H}; H_2 = \frac{h_2}{H}; H_3 = \frac{h_3}{H}.$$

In a method for pedestrian re-identification provided by an embodiment of the disclosure, the training process of the neural network is divided into two stages. The first stage is a stage in which data is propagated from a lower level to a higher level, i.e., a forward propagation stage. The other stage is a back propagation stage. That is, when the result of the forward propagation is not consistent with the expectation, the error is propagated and trained from the high level to the bottom level. The training process may include the following steps:

the network layer weight values are initialized, and a random initialization is generally used;

the input image data obtains an output value through forward propagation of each layer such as a convolution layer, a down-sampling layer and a fully connected layer;

the error between the output value of the network and the target value (label) is obtained by the method of calculating the output value of the network and the loss of the network and the input pseudo label;

the error is transmitted back into the network, and the back propagation errors of each layer of the network, such as fully connected layers, convolution layers and other layers, is obtained successively;

each layer of the network adjusts all the weight coefficients in the network according to the back propagation error of each layer, namely, updating the weight;

new image data is randomly selected again, and then it proceeds to the second step for the network forward propagation to obtain an output value;

for an infinite reciprocating iteration, when the error between the output value and the target value (label) of the network is calculated to be less than a certain threshold value, or the number of iterations exceeds a certain threshold value, the training is ended; and the trained network parameters of all layers are saved.

Figure 5:
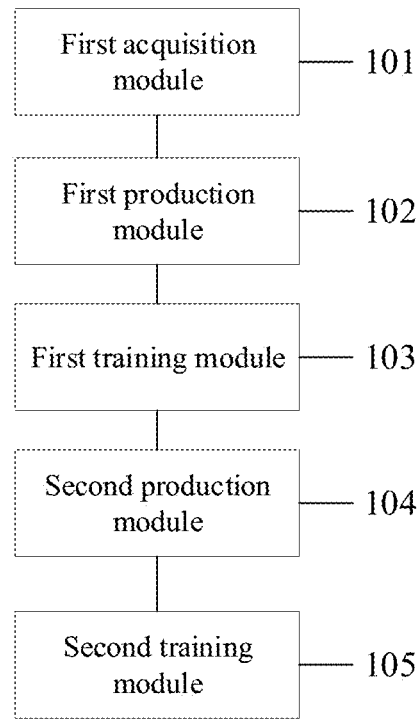
FIG. 5 is a structural diagram of a system for pedestrian re-identification according to an embodiment of the disclosure.

With reference to FIG. 5, FIG. 5 is a structural diagram of a system for pedestrian re-identification according to an embodiment of the disclosure.

Embodiments of the disclosure provide a system for pedestrian re-identification that may include:

a first acquisition module 101 configured for acquiring a first-type pedestrian image without a label;

a first production module 102 configured for producing label information for the first-type pedestrian image;

a first training module 103 configured for training a target pedestrian re-identification network based on the first-type pedestrian image and the label information to obtain the target pedestrian re-identification network from a first training;

a second production module 104 configured for discarding a target region in the first-type pedestrian image to obtain a second-type pedestrian image; and a second training module 105 configured for training the target pedestrian re-identification network from the first training based on the first-type pedestrian image and the second-type pedestrian image to obtain the target pedestrian re-identification network from a second training to perform pedestrian re-identification based on the target pedestrian re-identification network.

An embodiment of the disclosure provides a system for pedestrian re-identification. The first production module may include:

a first determination unit configured for determining body part boundary information in the first-type pedestrian image; and a first setting unit configured for using the body part boundary information as the label information of the first-type pedestrian image.

The embodiment of the disclosure provides a system for pedestrian re-identification, and the first determination unit may be used for determining the body part boundary information in the first-type pedestrian image based on a template matching method.

The embodiment of the disclosure provides a system for pedestrian re-identification, and the first determination unit may be used for: acquiring a human body part template that is preset; determining a body part region corresponding to the human body part template in the first-type pedestrian image; determining boundary coordinates of the body part region, the boundary coordinates including a height value of a boundary of the body part region in a first-type pedestrian image; and taking a ratio of the boundary coordinates to a total height of the first-type pedestrian image as the body part boundary information.

An embodiment of the disclosure provides a system for pedestrian re-identification. The human body part template may include a head template, a torso template, and a lower limb template; the body part region includes a head region, a torso region, and a lower limb region; the body part boundary information includes starting boundary information of the head region, boundary information between the head region and the torso region, boundary information between the torso region and the lower limb region, and ending boundary information of the lower limb region.

The embodiment of the disclosure provides a system for pedestrian re-identification. The first determination unit may be used for cutting out a temporary image with the same size as that of the human body part template from the first-type pedestrian image; calculating a similarity value between each temporary image and a human body part template; and selecting the temporary image with the largest similarity value as the body part region corresponding to the human body part template in the first-type pedestrian image.

An embodiment of the disclosure provides a system for pedestrian re-identification, and the first training module may include:
  a first constituent unit configured for connecting a target pedestrian re-identification network with a first auxiliary network to obtain a first target network;
  a first training unit configured for training the first target network based on the first-type pedestrian image and the label information to obtain the trained first target network; and
  a first deletion unit configured for removing the first auxiliary network from the first target network to obtain the target pedestrian re-identification network from the first training.

An embodiment of the disclosure provides a system for pedestrian re-identification. The target pedestrian re-identification network includes an ResNet50 network; and the first auxiliary network includes a fully connected layer connected to a seventh portion of the Resnet50 network.

An embodiment of the disclosure provides a system for pedestrian re-identification, and the second production module may include:
  a first division unit configured for dividing the first-type pedestrian image into a preset quantity of grids;
  a first selection unit configured for randomly selecting the preset quantity of grids from the grids as the target region for being discarded; and
  a first production unit configured for filling pixels of the target region in the first-type pedestrian image to zero to obtain the second-type pedestrian image.

An embodiment of the disclosure provides a system for pedestrian re-identification, and the second training module may include:
  a second constituent unit configured for connecting the target pedestrian re-identification network from the first training with a second auxiliary network to obtain a second target network;
  a second training unit configured for training the second target network based on the first-type pedestrian image and the second-type pedestrian image to obtain the trained second target network; and
  a second deletion unit configured for removing the second auxiliary network from the second target network to obtain a target pedestrian re-identification network from a second training.

An embodiment of the disclosure provides a system for pedestrian re-identification. The target pedestrian re-identification network includes an ResNet50 network. The second auxiliary network includes an image segmentation network connected to the first portion and the fourth portion of the Resnet50 network.

Figure 6:
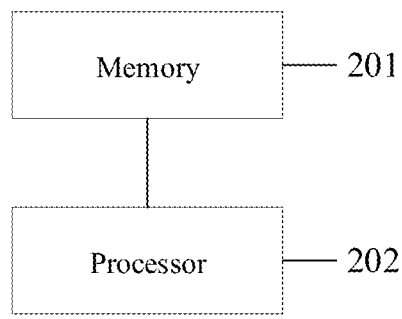
FIG. 6 is a structural diagram of a device for pedestrian re-identification according to an embodiment of the disclosure.

The disclosure also provides a device for pedestrian re-identification and a computer non-volatile readable storage medium, which both have the corresponding effects of the method for pedestrian re-identification provided by an embodiment of the disclosure. With reference to FIG. 6, FIG. 6 is a structural diagram of a device for pedestrian re-identification according to an embodiment of the disclosure.

An embodiment of the disclosure provides a device for pedestrian re-identification, including a memory 201 and a processor 202. The memory 201 stores a computer program which, when executed by the processor 202, implements the steps of:
  acquiring a first-type pedestrian image without a label;
  producing label information for the first-type pedestrian image;
  training a target pedestrian re-identification network based on the first-type pedestrian image and the label information to obtain the target pedestrian re-identification network from a first training;
  discarding a target region in the first-type pedestrian image to obtain a second-type pedestrian image; and
  training the target pedestrian re-identification network from the first training based on the first-type pedestrian image and the second-type pedestrian image to obtain the target pedestrian re-identification network from a second training to perform pedestrian re-identification based on the target pedestrian re-identification network.

An embodiment of the disclosure provides a device for pedestrian re-identification, including a memory 201 and a processor 202. The memory 201 stores a computer program which, when executed by the processor 202, implements the steps of determining body part boundary information in the first-type pedestrian image; and using the body part boundary information as the label information of the first-type pedestrian image.

An embodiment of the disclosure provides a device for pedestrian re-identification, including a memory 201 and a processor 202. The memory 201 stores a computer program which, when executed by the processor 202, implements the steps of determining the body part boundary information in the first-type pedestrian image based on a template matching method.

An embodiment of the disclosure provides a device for pedestrian re-identification, including a memory 201 and a processor 202. The memory 201 stores a computer program which, when executed by the processor 202, implements the steps of: acquiring a human body part template that is preset; determining a body part region corresponding to the human body part template in the first-type pedestrian image; determining boundary coordinates of the body part region, the boundary coordinates including a height value of a boundary of the body part region in a first-type pedestrian image; and taking a ratio of the boundary coordinates to a total height of the first-type pedestrian image as the body part boundary information.

An embodiment of the disclosure provides a device for pedestrian re-identification, including a memory 201 and a processor 202. The memory 201 stores a computer program which, when executed by the processor 202, implements the following steps. The human body part template includes a head template, a torso template, and a lower limb template; the body part region includes a head region, a torso region, and a lower limb region; the body part boundary information includes starting boundary information of the head region, boundary information between the head region and the torso region, boundary information between the torso region and the lower limb region, and ending boundary information of the lower limb region.

An embodiment of the disclosure provides a device for pedestrian re-identification, including a memory 201 and a processor 202. The memory 201 stores a computer program which, when executed by the processor 202, implements the steps of cutting out a temporary image with the same size as that of the human body part template from the first-type pedestrian image; calculating a similarity value between each temporary image and a human body part template; and selecting the temporary image with the largest similarity value as the body part region corresponding to the human body part template in the first-type pedestrian image.

An embodiment of the disclosure provides a device for pedestrian re-identification, including a memory 201 and a processor 202. The memory 201 stores a computer program which, when executed by the processor 202, implements the steps of connecting the target pedestrian re-identification network to the first auxiliary network to obtain a first target network; training the first target network based on the first-type pedestrian image and the label information to obtain a trained first target network; and removing the first auxiliary network from the first target network to obtain a target pedestrian re-identification network from the first training.

An embodiment of the disclosure provides a device for pedestrian re-identification, including a memory 201 and a processor 202. The memory 201 stores a computer program which, when executed by the processor 202, implements the following steps. The target pedestrian re-identification network includes an ResNet50 network; and the first auxiliary network includes a fully connected layer connected to a seventh portion of the Resnet50 network.

An embodiment of the disclosure provides a device for pedestrian re-identification, including a memory 201 and a processor 202. The memory 201 stores a computer program which, when executed by the processor 202, implements the steps of dividing the first-type pedestrian image into a preset quantity of grids; randomly selecting the preset quantity of grids from the grids as the target region for being discarded; and filling pixels of the target region in the first-type pedestrian image to zero to obtain the second-type pedestrian image.

An embodiment of the disclosure provides a device for pedestrian re-identification, including a memory 201 and a processor 202. The memory 201 stores a computer program which, when executed by the processor 202, implements the steps of connecting the target pedestrian re-identification network from the first training to a second auxiliary network to obtain a second target network; training the second target network based on the first-type pedestrian image and the second-type pedestrian image to obtain a trained second target network; and removing the second auxiliary network in the second target network to obtain a target pedestrian re-identification network from the second training.

An embodiment of the disclosure provides a device for pedestrian re-identification, including a memory 201 and a processor 202. The memory 201 stores a computer program which, when executed by the processor 202, implements the following steps. The target pedestrian re-identification network includes an ResNet50 network. The second auxiliary network includes an image segmentation network connected to the first portion and the fourth portion of the Resnet50 network.

Figure 7:
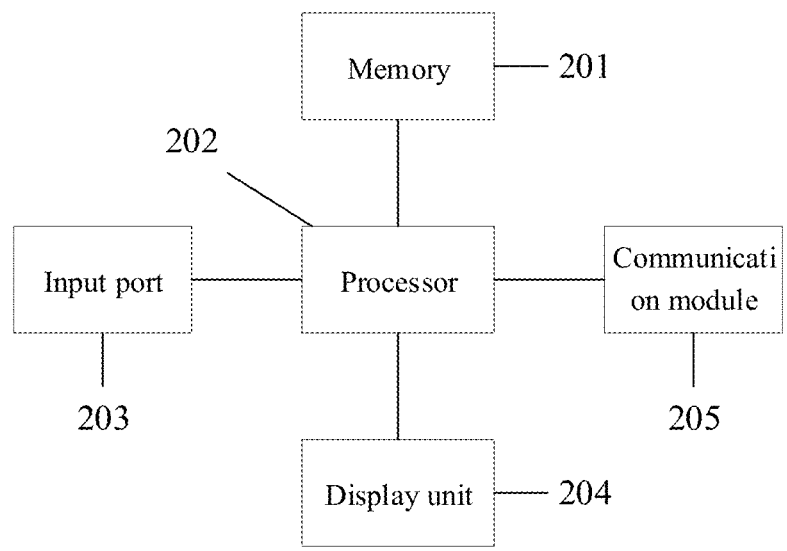
FIG. 7 is another structural diagram of a device for pedestrian re-identification according to an embodiment of the disclosure.

With reference to FIG. 7, another device for pedestrian re-identification according to an embodiment of the disclosure may further include an input port 203 connected to the processor 202 for transmitting an externally input command to the processor 202; a display unit 204 connected to the processor 202 for displaying the processing result of the processor 202 to the outside world; and a communication module 205 connected to the processor 202 for enabling the device for pedestrian re-identification to communicate with the outside world. The display unit 204 may be a display panel, a laser scanning display, etc. The communication modes adopted by the communication module 205 include, but are not limited to, the mobile high definition link technology (HML), the universal serial bus (USB), the high definition multimedia interface (HDMI) and the wireless connection including the Wireless Fidelity (WiFi), the bluetooth communication technology, the low-power Bluetooth communication technology, and the IEEE802.11s-based communication technology.

An embodiment of the disclosure provides a computer non-volatile readable storage medium. The computer non-volatile readable storage medium stores a computer program which, when executed by a processor, implements the steps of acquiring a first-type pedestrian image without a label;
producing label information for the first-type pedestrian image;
training a target pedestrian re-identification network based on the first-type pedestrian image and the label information to obtain the target pedestrian re-identification network from a first training;
discarding a target region in the first-type pedestrian image to obtain a second-type pedestrian image; and
training the target pedestrian re-identification network from the first training based on the first-type pedestrian image and the second-type pedestrian image to obtain the target pedestrian re-identification network from a second training to perform pedestrian re-identification based on the target pedestrian re-identification network.

An embodiment of the disclosure provides a computer non-volatile readable storage medium. The computer-readable storage medium stores a computer program which, when executed by a processor, implements the steps of determining body part boundary information in the first-type pedestrian image; and using the body part boundary information as the label information of the first-type pedestrian image.

An embodiment of the disclosure provides a computer non-volatile readable storage medium. The computer non-volatile readable storage medium stores a computer program which, when executed by a processor, implements the steps of determining the body part boundary information in the first-type pedestrian image based on a template matching method.

An embodiment of the disclosure provides a computer non-volatile readable storage medium. The computer non-volatile readable storage medium stores a computer program which, when executed by a processor, implements the steps of acquiring a human body part template that is preset; determining a body part region corresponding to the human body part template in the first-type pedestrian image; determining boundary coordinates of the body part region, the boundary coordinates including a height value of a boundary of the body part region in a first-type pedestrian image; and taking a ratio of the boundary coordinates to a total height of the first-type pedestrian image as the body part boundary information.

An embodiment of the disclosure provides a computer non-volatile readable storage medium. The computer non-volatile readable storage medium stores a computer program which, when executed by a processor, implements the following steps. The human body part template includes a head template, a torso template, and a lower limb template; the body part region includes a head region, a torso region, and a lower limb region; the body part boundary information includes starting boundary information of the head region, boundary information between the head region and the torso region, boundary information between the torso region and the lower limb region, and ending boundary information of the lower limb region.

An embodiment of the disclosure provides a computer non-volatile readable storage medium. The computer non-volatile readable storage medium stores a computer program which, when executed by a processor, implements the steps of cutting out a temporary image with the same size as that of the human body part template from the first-type pedestrian image; calculating a similarity value between each temporary image and a human body part template; and selecting the temporary image with the largest similarity value as the body part region corresponding to the human body part template in the first-type pedestrian image.

An embodiment of the disclosure provides a computer non-volatile readable storage medium. The computer non-volatile readable storage medium stores a computer program which, when executed by a processor, implements the steps of connecting the target pedestrian re-identification network to the first auxiliary network to obtain a first target network; training the first target network based on the first-type pedestrian image and the label information to obtain a trained first target network; and removing the first auxiliary network from the first target network to obtain a target pedestrian re-identification network from the first training.

An embodiment of the disclosure provides a computer non-volatile readable storage medium. The computer non-volatile readable storage medium stores a computer program which, when executed by a processor, implements the following steps. The target pedestrian re-identification network includes an ResNet50 network; and the first auxiliary network includes a fully connected layer connected to a seventh portion of the Resnet50 network.

An embodiment of the disclosure provides a computer non-volatile readable storage medium. The computer non-volatile readable storage medium stores a computer program which, when executed by a processor, implements the steps of dividing the first-type pedestrian image into a preset quantity of grids; randomly selecting the preset quantity of grids from the grids as the target region for being discarded; and filling pixels of the target region in the first-type pedestrian image to zero to obtain the second-type pedestrian image.

An embodiment of the disclosure provides a computer non-volatile readable storage medium. The computer non-volatile readable storage medium stores a computer program which, when executed by a processor, implements the steps of connecting the target pedestrian re-identification network from the first training to a second auxiliary network to obtain a second target network; training the second target network based on the first-type pedestrian image and the second-type pedestrian image to obtain a trained second target network; and removing the second auxiliary network in the second target network to obtain a target pedestrian re-identification network from the second training.

An embodiment of the disclosure provides a computer non-volatile readable storage medium. The computer non-volatile readable storage medium stores a computer program which, when executed by a processor, implements the following steps. The target pedestrian re-identification network includes an ResNet50 network. The second auxiliary network includes an image segmentation network connected to the first portion and the fourth portion of the Resnet50 network.

Reference herein to computer non-volatile readable storage media includes an RAM, a memory, an ROM, an electrically programmable ROM, an electrically erasable programmable ROM, a register, a hard disk, a removable disk, a CD-ROM, or any other form of storage medium known in the art.

The description of the relevant portions of the system and device for pedestrian re-identification, and the computer-readable storage medium provided in the embodiments of the disclosure can be referred to the detailed description of the corresponding portions of the method for pedestrian re-identification provided in the embodiments of the disclosure, which will not be described in detail herein. In addition, the parts of the above-mentioned technical solutions provided by the embodiments of the disclosure which are consistent with the implementation principles of corresponding technical solutions in the prior art are not described in detail so as not to redundantly describe.

It should also be noted that in this document, relational terms such as "first" and "second" are merely used to distinguish one entity or operation from another and do not necessarily require or imply that there is any such actual relationship or order between these entities or operations. Moreover, the terms "include," "comprising," or any other variants are intended to encompass non-exclusive inclusion, so that a process, method, item, or device that includes a series of elements not only includes those elements but also includes other elements that are not specifically listed, or even includes elements inherent to such a process, method, item, or device. Unless further restricted, the elements limited by the phrase "including a . . . " do not exclude the existence of the same elements in the process, method, item, or device that includes the elements.

The above description of the disclosed embodiments enables a person skilled in the art to implement or use the present application. Various modifications of these embodiments will be apparent to those skilled in the art, and the general principles defined in this document can be implemented in other embodiments without departing from the spirit or scope of the present application. Therefore, this application will not be limited to the embodiments shown in this document, but will conform to the broadest scope consistent with the principles and novel features disclosed herein.

The invention claimed is:

1. A method for pedestrian re-identification, comprising:
acquiring a first-type pedestrian image without a label;
producing label information for the first-type pedestrian image;
training a target pedestrian re-identification network based on the first-type pedestrian image and the label information to obtain the target pedestrian re-identification network from a first training;

discarding a target region in the first-type pedestrian image to obtain a second-type pedestrian image; and training the target pedestrian re-identification network from the first training based on the first-type pedestrian image and the second-type pedestrian image to obtain the target pedestrian re-identification network from a second training to perform pedestrian re-identification based on the target pedestrian re-identification network.

2. The method according to claim 1, wherein the producing label information for the first-type pedestrian image comprises:

determining body part boundary information in the first-type pedestrian image; and using the body part boundary information as the label information of the first-type pedestrian image.

3. The method according to claim 2, wherein the determining body part boundary information in the first-type pedestrian image comprises:

determining the body part boundary information in the first-type pedestrian image based on a template matching method.

4. The method according to claim 3, wherein the determining the body part boundary information in the first-type pedestrian image based on a template matching method comprises:

acquiring a human body part template that is preset;

determining a body part region corresponding to the human body part template in the first-type pedestrian image;

determining boundary coordinates of the body part region, the boundary coordinates including a height value of a boundary of the body part region in a first-type pedestrian image; and taking a ratio of the boundary coordinates to a total height of the first-type pedestrian image as the body part boundary information.

5. The method according to claim 4, wherein the human body part template comprises a head template, a torso template, and a lower limb template; the body part region comprises a head region, a torso region, and a lower limb region; the body part boundary information comprises starting boundary information of the head region, boundary information between the head region and the torso region, boundary information between the torso region and the lower limb region, and ending boundary information of the lower limb region.

6. The method according to claim 5, wherein the determining a body part region corresponding to the human body part template in the first-type pedestrian image comprises:

cutting a temporary image of the same size as the human body part template from the first-type pedestrian image;

calculating a similarity value between each of the temporary images and the human body part template; and selecting the temporary image with a maximum similarity value as the body part region corresponding to the human body part template in the first-type pedestrian image.

7. The method according to claim 1, wherein the training a target pedestrian re-identification network based on the first-type pedestrian image and the label information to obtain the target pedestrian re-identification network from a first training comprises:

connecting the target pedestrian re-identification network with a first auxiliary network to obtain a first target network;

training the first target network based on the first-type pedestrian image and the label information to obtain the trained first target network; and removing the first auxiliary network from the trained first target network to obtain the target pedestrian re-identification network from the first training.

8. The method according to claim 7, wherein the target pedestrian re-identification network comprises a ResNet50 network; and the first auxiliary network includes a fully connected layer connected to a seventh portion of the Resnet50 network.

9. The method according to claim 8, wherein the first portion of the target pedestrian re-identification network does not contain a residual block, and second portion, third portion, fourth portion, and fifth portion structures of the target pedestrian re-identification network all contain residual blocks.

10. The method according to claim 9, wherein each residual block contains three levels of convolution.

11. The method according to claim 8, wherein the fully connected layer comprises 12 neurons.

12. The method according to claim 1, wherein the discarding a target region in the first-type pedestrian image to obtain a second-type pedestrian image comprises:

dividing the first-type pedestrian image into a preset quantity of grids;

randomly selecting a target quantity of grids from the preset quantity of grids as the target region for being discarded; and filling pixels of the target region in the first-type pedestrian image to zero to obtain the second-type pedestrian image.

13. The method according to claim 12, wherein the training the target pedestrian re-identification network from the first training based on the first-type pedestrian image and the second-type pedestrian image to obtain the target pedestrian re-identification network from a second training comprises:

connecting the target pedestrian re-identification network from the first training with a second auxiliary network to obtain a second target network;

training the second target network based on the first-type pedestrian image and the second-type pedestrian image to obtain the trained second target network; and removing the second auxiliary network from the second target network to obtain a target pedestrian re-identification network from a second training.

14. The method according to claim 13, wherein the target pedestrian re-identification network comprises a ResNet50 network; and the second auxiliary network includes an image segmentation network connected to first and fourth portions of the Resnet50 network.

15. The method according to claim 13, wherein a loss function of the second auxiliary network is an L2 loss loss function.

16. The method according to claim 13, wherein the second auxiliary network comprises an encoder portion and a decoder portion;

the encoder portion is used for obtaining five groups of feature maps by using four types of void convolution blocks with different expansion rates and a global average pooling block, splicing the five groups of feature map together, and sending the five groups of feature maps to the decoder portion after passing through a 1×1 convolution block; and the decoder portion is used for splicing a low-level feature map with channel dimension reduction and a feature map obtained by linear interpolation and up-sampling, sending to a group of 3×3 convolution blocks for processing, and performing linear interpolation and up-sampling again to obtain a prediction map with the same size as the resolution of an original map.

17. The method according to claim 1, wherein after the training the target pedestrian re-identification network from the first training based on the first-type pedestrian image and the second-type pedestrian image to obtain the target pedestrian re-identification network from a second training, the method further comprises:
acquiring a third-type pedestrian image with a label, and training the target pedestrian re-identification network from the second training based on the third-type pedestrian image to obtain a trained target pedestrian re-identification network, so as to perform the pedestrian re-identification based on the trained target pedestrian re-identification network.

18. A device for pedestrian re-identification, comprising:
a memory configured for storing a computer program; and
a processor configured for implementing the steps of the method for pedestrian re-identification according to claim 1 when executing the computer program.

19. The device for pedestrian re-identification according to claim 18, wherein the producing label information for the first-type pedestrian image comprises:
determining body part boundary information in the first-type pedestrian image; and
using the body part boundary information as the label information of the first-type pedestrian image.

20. A non-transitory computer readable storage medium storing with a computer program that when executed by a processor, implements the steps of the method for pedestrian re-identification according to claim 1.

* * * * *